(12) United States Patent
Seize et al.

(10) Patent No.: US 9,169,743 B2
(45) Date of Patent: Oct. 27, 2015

(54) METALLIC ANNULAR CONNECTION STRUCTURE FOR AIRCRAFT TURBOMACHINE

(75) Inventors: Guilhem Seize, Corbeil-Essonnes (FR); Thomas Alain Christian Vincent, Palaiseau (FR)

(73) Assignee: SNECMA, Paris (FR)

( * ) Notice: Subject to any disclaimer, the term of this patent is extended or adjusted under 35 U.S.C. 154(b) by 806 days.

(21) Appl. No.: 13/505,942

(22) PCT Filed: Nov. 10, 2010

(86) PCT No.: PCT/EP2010/067183
§ 371 (c)(1),
(2), (4) Date: May 3, 2012

(87) PCT Pub. No.: WO2011/058041
PCT Pub. Date: May 19, 2011

(65) Prior Publication Data
US 2012/0219415 A1    Aug. 30, 2012

(30) Foreign Application Priority Data
Nov. 12, 2009 (FR) ..................................... 09 57969

(51) Int. Cl.
*F01D 25/28* (2006.01)
*F01D 25/16* (2006.01)
*F02K 1/80* (2006.01)

(52) U.S. Cl.
CPC .............. *F01D 25/28* (2013.01); *F01D 25/162* (2013.01); *F02K 1/80* (2013.01); *F05D 2260/30* (2013.01); *Y02T 50/672* (2013.01)

(58) Field of Classification Search
CPC ....... F01D 25/16; F01D 25/162; F01D 25/24; F01D 25/28; Y02T 50/672; F02K 1/80; F23R 3/002; F02C 7/20
See application file for complete search history.

(56) References Cited

U.S. PATENT DOCUMENTS

| 4,534,167 | A |   | 8/1985 | Chee |
| 4,940,386 | A | * | 7/1990 | Feuvrier et al. ............. 415/209.2 |
| 5,127,793 | A | * | 7/1992 | Walker et al. .................. 415/115 |
| 6,092,987 | A |   | 7/2000 | Honda et al. |
| 2009/0165463 | A1 | | 7/2009 | Vauchel et al. |
| 2009/0175716 | A1 | | 7/2009 | Vetters |

FOREIGN PATENT DOCUMENTS

| FR | 2 896 481 | 7/2007 |
| GB | 2 119 859 | 11/1983 |
| WO | 84 02507 | 7/1984 |

OTHER PUBLICATIONS

International Search Report Issued Dec. 28, 2010 in PCT/EP10/67183 Filed Nov. 10, 2010.

\* cited by examiner

*Primary Examiner* — Edward Look
*Assistant Examiner* — Juan G Flores
(74) *Attorney, Agent, or Firm* — Oblon, McClelland, Maier & Neustadt, L.L.P.

(57) ABSTRACT

A metallic annular connection structure between two parts for an aircraft turbomachine, with an arbitrary half-section including two primary branches and a base forming a first U opening up in the radial direction from a longitudinal axis, and two secondary branches forming a second U with one of the two primary branches opening up in the longitudinal direction. The primary and secondary branches and the base of the first U are made in a single piece.

5 Claims, 3 Drawing Sheets

METALLIC ANNULAR CONNECTION STRUCTURE FOR AIRCRAFT TURBOMACHINE

BACKGROUND OF THE INVENTION

1. Field of the Invention

This invention relates to a metallic annular connection structure between two parts for an aircraft turbomachine, preferably a turbojet type of turbomachine.

2. Discussion of the Background

On such a turbojet, one or several metallic annular connection structures are provided that will connect two annular parts. This is the case for example for the metallic annular connection structure between a downstream part forming the thrust inverter structure and an upstream part forming an envelope whose internal face defines an external delimitation surface of a secondary annular stream, this upstream part also being called an Outer Fan Duct.

In this case, an arbitrary half-section through the connection structure comprises two branches and a base forming a U that opens in the radial direction from a longitudinal axis. Furthermore, when one of the parts to be connected is made of a composite material, the connection structure is normally used with a metallic attachment flange bolted onto one of the branches of the above mentioned U, that itself defines a second U opening up longitudinally in order to contain the annular end of the part made of a composite material.

The presence of this additional attachment flange combined with the presence of the bolts used to attach it has a strong impact on the global mass of the assembly obtained, to the extent that much of the benefit resulting from the use of a composite material for the part concerned is lost.

This mass problem is accentuated when the two parts to be connected are made of a composite material, because in that case two separate attachment flanges have to be provided, each bolted onto the central U of the connection structure.

SUMMARY OF THE INVENTION

In order to face this mass problem, the invention firstly proposes a metallic annular connection structure between two parts for an aircraft turbomachine, with two primary branches and a base in an arbitrary half-section forming a first U opening up radially inwards or outwards from a longitudinal axis of said annular structure, and two secondary branches forming a second U with one of the two primary branches opening up longitudinally. According to the invention, the primary and secondary branches and the base of the first U are made in a single part.

Thus, by forming the annular connection structure as a single piece, the result is a saving of mass, particularly because there is no longer any need to bolt the first U onto the second U.

Preferably, an arbitrary half-section of the connection structure also comprises two tertiary branches, combining with the other of the two primary branches to form a third U opening up longitudinally in a direction opposite to the direction of the second U, and the primary, secondary and tertiary branches and the base of the first U are made in a single piece. In this configuration, the second U may hold a first part, preferably made of a composite material, while the third U can receive a second part also preferably made of a composite material. Alternately, the second part can be mounted directly on one of the branches of the first U, for example by bolting, particularly if it is metallic.

Another object of the invention is an assembly for an aircraft turbomachine comprising the metallic annular structure described above and a first annular part made of a composite material, the annular end of which is housed in said second U. Preferably as mentioned above, the assembly also comprises a second annular part made of a composite material, one annular end of which is housed in said third U.

Finally, another object of the invention is an aircraft turbomachine comprising an assembly like that described above, preferably in which:

said metallic annular connection structure is centred on the longitudinal axis of the turbomachine;

said first annular part comprises means forming an envelope whose internal face defines the annular external delimitation surface of a secondary stream in the turbomachine; and said second annular part forms a thrust inverter structure.

Preferably, the turbomachine also comprises an exhaust casing connected to said metallic annular connection structure arranged radially outwards from this exhaust casing, through connecting rods.

BRIEF DESCRIPTION OF THE DRAWINGS

Other advantages and characteristics of the invention will become clear after reading the detailed non-limitative description given below.

This description refers to the appended drawings among which.

DETAILED DESCRIPTION OF THE PREFERRED EMBODIMENTS

Figure 1:
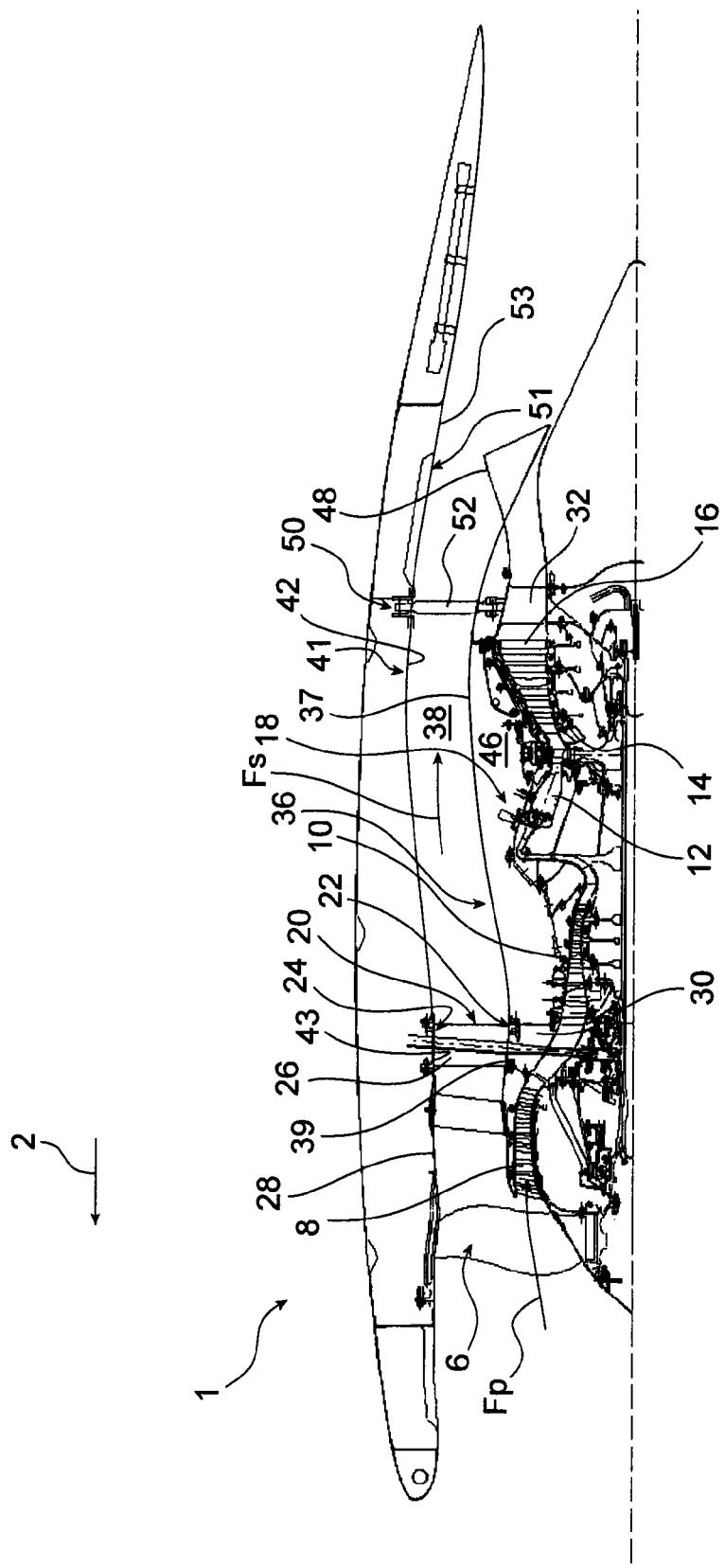
FIG. 1 shows a diagrammatic longitudinal half-sectional view of a double flow turbojet for an aircraft, according to one preferred embodiment of this invention.

With reference firstly to FIG. 1, the figure shows a preferred embodiment of an aircraft turbojet 1. Throughout the remaining description, the terms "forward" and "aft" are in relation to a forward movement of the aircraft caused by the thrust from the turbojet, this direction being diagrammatically represented by the arrow 2. Furthermore, the terms "upstream" and "downstream" should be considered in relation to a main gas flow direction within the turbojet, contrary to the forward movement direction 2 of the aircraft.

Working in order from the upstream end to the downstream end, the turbojet 1 with a longitudinal axis 4 comprises a fan 6, a low pressure compressor 8, a high pressure compressor 10, an annular combustion chamber 12, a high pressure turbine 14 and a low pressure turbine 16. The compressors, the turbines and the combustion chamber form the gas generator that is partly closed by a central casing 18 centred on the axis 4, through which a primary flow Fp of the turbojet passes.

In this case, the high pressure turbine 10 is a centrifuge and therefore comprises a centrifugal wheel that makes it possible to maximise the distance to the central casing 18 of the axis 4 in the radial direction at a downstream end of this wheel.

This central casing 18 prolongs an intermediate casing 20 equipped with a concentric inner shell 22 and outer shell 24 in the aft direction, in which there are structural arms 26 between the shells to connect the shells. The outer shell 24 aerodynamically prolongs the fan casing 28 in the aft direction, while the inner shell 22 is radially outwards from the forward end of the central casing 18, fixed onto a hub 30 of the intermediate casing.

The aft end of the central casing 18 is also prolonged by an exhaust casing 32 located downstream from the low pressure turbine 16.

All the above-mentioned casings are fixed to each other, to jointly form a structure through which static and dynamic forces pass.

The first means 36 forming the envelope aerodynamically prolong the inner shell 22 in the aft direction, and are arranged around the central casing 18. These means, called the Inner Fan Duct, have an external annular surface 37 that forms the internal delimitation of a secondary annular stream 38, through which the secondary flow Fs of the turbojet passes. The surface 37 aerodynamically prolongs another surface 39 in the aft direction, that also forms the internal delimitation of the secondary annular stream 28, this surface 39 being defined by the inner shell 22. Furthermore, there is a mixer 48 downstream from the surface 37, that has the known function of mixing the primary Fp and secondary Fs flows.

The annular space 46 left free between the central casing 18 and the first means forming the envelope acts as a compartment called the "core compartment", inside which equipment is placed.

Second means 41 forming an envelope are arranged concentric with and external to the above mentioned first means 36, aerodynamically prolonging the outer shell 24 in the aft direction. These means called the Outer Fan Duct, have an internal annular surface 42 that forms the external delimitation of the stream 38. The surface 42 aerodynamically prolongs another surface 43 in the aft direction, also used for external delimitation of the annular secondary stream 38, this surface 43 being defined by the outer shell 24.

The second means forming an envelope 41, preferably made of a composite material of the type including a mix of resin and glass fibres and/or carbon fibres, are preferably fixed upstream from the outer shell 24 and downstream from a metallic annular connection structure that also forms part of this invention.

This connection structure, reference 50 in the figures, connects the envelope 41 to a downstream annular structure 51 forming the thrust inverter, also preferably made from a composite material of the type including a mix of resin and glass fibres and/or carbon fibres. The annular structure forming the thrust inverter 51, like the connection structure 50, is centred on the axis 4. Its internal surface 53 also forms the external delimitation of the annular secondary stream 38 located in the aft prolongation of the surface 42.

As can be seen in FIG. 1, the exhaust casing 32 is connected through connecting rods 52 to the connection structure 50 located adjacent to and outside this casing 32 in the radial direction.

The connecting rods 52 are arranged in a transverse plane of the turbojet and pass through the first envelope 36 equipped with recesses through which these rods can pass, the outer radial end of each of the rods being mounted on the connection structure 50, and the inner radial end being articulated on the exhaust casing 32.

Figure 2:
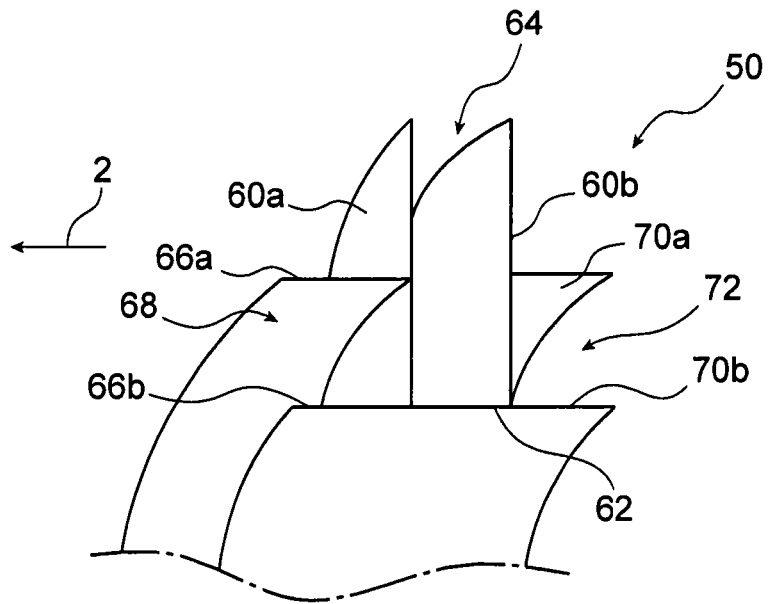
FIG. 2 shows a partial perspective view of an annular metallic connection structure fitted on the turbojet shown in the previous figure.

FIG. 2 shows an example embodiment of the connection structure 50 made in a single piece, for example by moulding or machining a solid ring.

An arbitrary half-section of the connection structure 50 in a radial and longitudinal plane comprises firstly a central part with two primary branches 60a, 60b and a base 62 jointly forming a first U 64 opening outwards in the radial direction from the longitudinal axis 4. The base 62 is along the longitudinal direction, while the branches 60a, 60b are in a radial direction.

The connection structure 50 also comprises two secondary branches 66a, 66b that, with the radially internal part of the primary branch 60a, form a second U 68 opening up longitudinally forwards. Similarly, the connection structure 50 also comprises two tertiary branches 70a, 70b that, with the radially internal part of the primary branch 60b, form a third U 72 opening up longitudinally in the aft direction.

In the embodiment shown, the branches 66b, 70b and the base 62 located between the branches form a single continuous straight line parallel to the axis 4.

Figure 3:
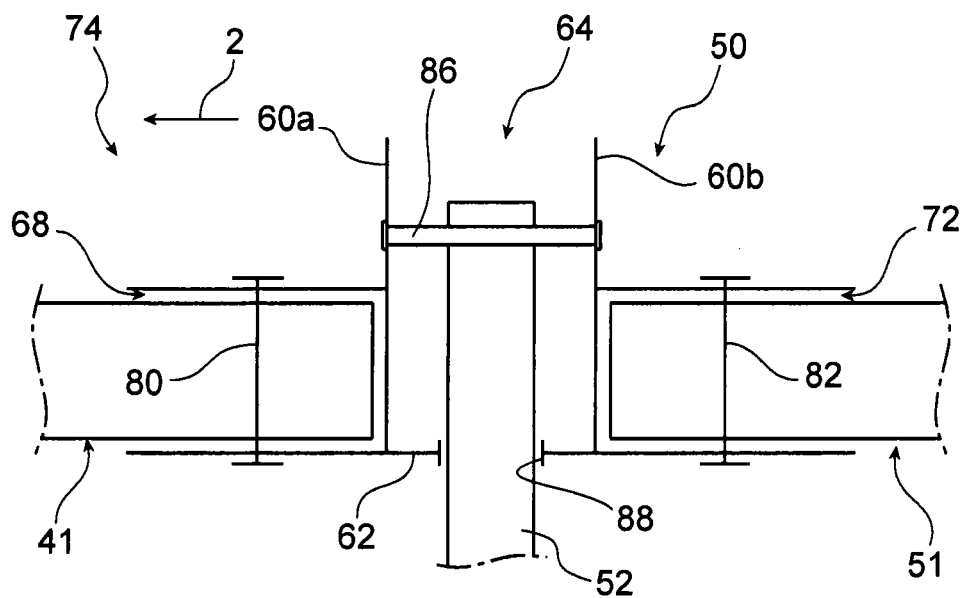
FIG. 3 shows a diagrammatic half-sectional view of the turbojet assembly comprising the metallic annular connection structure.

FIG. 3 shows the assembly 74 integrating the connection structure 50 that has just been described with reference to FIG. 2, and the envelope 41 and the thrust inverter structure 51. The downstream annular end of the envelope 41 is housed in the annular space defined by the second U 68 and is fixed to it by through radial bolts 80 or similar. Similarly, the upstream annular end of the thrust inverter structure 51 is housed in the annular space defined by the third U 72 and is fixed to it by through radial bolts 82 or similar. This FIG. 3 shows that the external radial end of the connecting rods 52 is articulated onto the first U 64 by means of longitudinal axes 86 mounted at their ends on the primary branches 60a, 60b. This is done by forming appropriate orifices 88 in the base 62, so that the rods 52 can pass through them.

Figure 4:
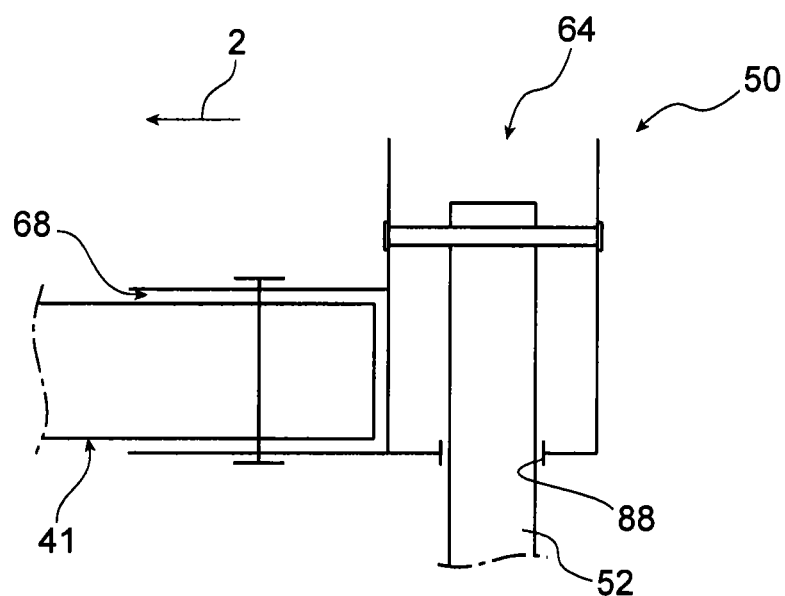
FIG. 4 shows a view similar to that in FIG. 3, with the assembly in the form of another preferred embodiment of this invention.

One alternative embodiment shown in FIG. 4 shows a connection structure 50 that does not have a third U, this alternative being preferred when the structure forming the thrust inverter structure 51 can be mounted directly onto the downstream primary branch 60b, for example by bolting. This is the case particularly when the structure 51 is metallic.

Similarly, it would be possible to keep only the third U and to eliminate the second when the envelope 41 can be mounted directly on the upstream primary branch 60a, for example by bolting.

Obviously, those skilled in the art could make many modifications to the invention as described above, as non-limitative examples only.

The invention claimed is:

1. An assembly for an aircraft turbomachine, comprising:
a metallic annular connection structure between two parts for the aircraft turbomachine, with an arbitrary half-section comprising:
two primary branches and a base forming a first U opening up in the radial direction from a longitudinal axis of the annular structure, two secondary branches forming a second U with one of the two primary branches opening up in the longitudinal direction, wherein the primary branches and secondary branches and the base of the first U are made in a single piece;
wherein each arbitrary half-section further comprises two tertiary branches combining with other of the two primary branches to form a third U opening up longitudinally in a direction opposite to the direction of the second U, and wherein the primary branches, secondary branches, and tertiary branches and the base of the first U are made in a single piece; and
a first annular part made of a composite material, the annular end of which is housed in the second U.

2. An assembly according to claim 1, further comprising a second annular part made of a composite material, one annular end of which is housed in the third U.

3. An aircraft turbomachine comprising an assembly according to claim 1.

4. A turbomachine according to claim 3, in which:
the metallic annular connection structure is centered on the longitudinal axis of the turbomachine;
the first annular part comprises means forming an envelope whose internal face defines an annular external delimitation surface of a secondary stream of the turbomachine; and
wherein the assembly further comprising a second annular part, one annular end of which is housed in the third U and which second annular part forms a thrust inverter structure.

5. A turbomachine according to claim 4, further comprising an exhaust casing connected to the metallic annular connection structure arranged radially outwards from the exhaust casing, through connecting rods.

\* \* \* \* \*